United States Patent
Kikuchi et al.

(10) Patent No.: US 8,270,484 B2
(45) Date of Patent: Sep. 18, 2012

(54) INFORMATION PROCESSING APPARATUS, CONVERSION CIRCUIT, AND PROGRAM

(75) Inventors: Yoshihiro Kikuchi, Hamura (JP); Tatsuro Fujisawa, Akishima (JP); Yuji Kawashima, Hamura (JP); Makoto Oshikiri, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1112 days.

(21) Appl. No.: 12/145,066

(22) Filed: Jun. 24, 2008

(65) Prior Publication Data

US 2009/0003442 A1    Jan. 1, 2009

(30) Foreign Application Priority Data

Jun. 26, 2007    (JP) .................................. 2007-168022

(51) Int. Cl.
 *H04N 7/12* (2006.01)
(52) U.S. Cl. .............................. 375/240.12; 375/240.13
(58) Field of Classification Search ............. 375/240.12, 375/240.13, 240.02
See application file for complete search history.

(56) References Cited

U.S. PATENT DOCUMENTS

| | | | |
|---|---|---|---|
| 7,031,681 B2 * | 4/2006 | Nagamura | 455/186.1 |
| 7,327,791 B1 * | 2/2008 | Sekiguchi et al. | 375/240.27 |
| 7,432,979 B2 * | 10/2008 | Tanaka | 348/448 |
| 7,630,442 B2 * | 12/2009 | Sekiguchi et al. | 375/240.27 |
| 2002/0097869 A1 * | 7/2002 | Pasqualino et al. | 380/200 |
| 2006/0013321 A1 * | 1/2006 | Sekiguchi et al. | 375/240.27 |
| 2006/0072614 A1 * | 4/2006 | Ogiso et al. | 370/474 |
| 2008/0145584 A1 * | 6/2008 | Fish et al. | 428/36.91 |

FOREIGN PATENT DOCUMENTS

| | | |
|---|---|---|
| JP | 10-262228 | 9/1998 |
| JP | 10-304375 | 11/1998 |
| JP | 11-288562 | 10/1999 |
| JP | 2002-158969 | 5/2002 |

OTHER PUBLICATIONS

Japanese Office Action dated Apr. 19, 2011.

* cited by examiner

*Primary Examiner* — Andrew Lee
(74) *Attorney, Agent, or Firm* — Pillsbury Winthrop Shaw Pittman, LLP

(57) ABSTRACT

An information processing apparatus is presented that includes a first determination unit which determines whether a processing target frame is a frame of a predetermined type and a second determination unit which determines whether an interval between the frame and a frame of the predetermined type located temporally nearest in the forward direction, exceeds a predetermined frame count. In addition, a conversion unit is included which converts the processing target frame into a frame of the predetermined type, when the second determination unit determines that the interval exceeds the predetermined frame count.

12 Claims, 4 Drawing Sheets

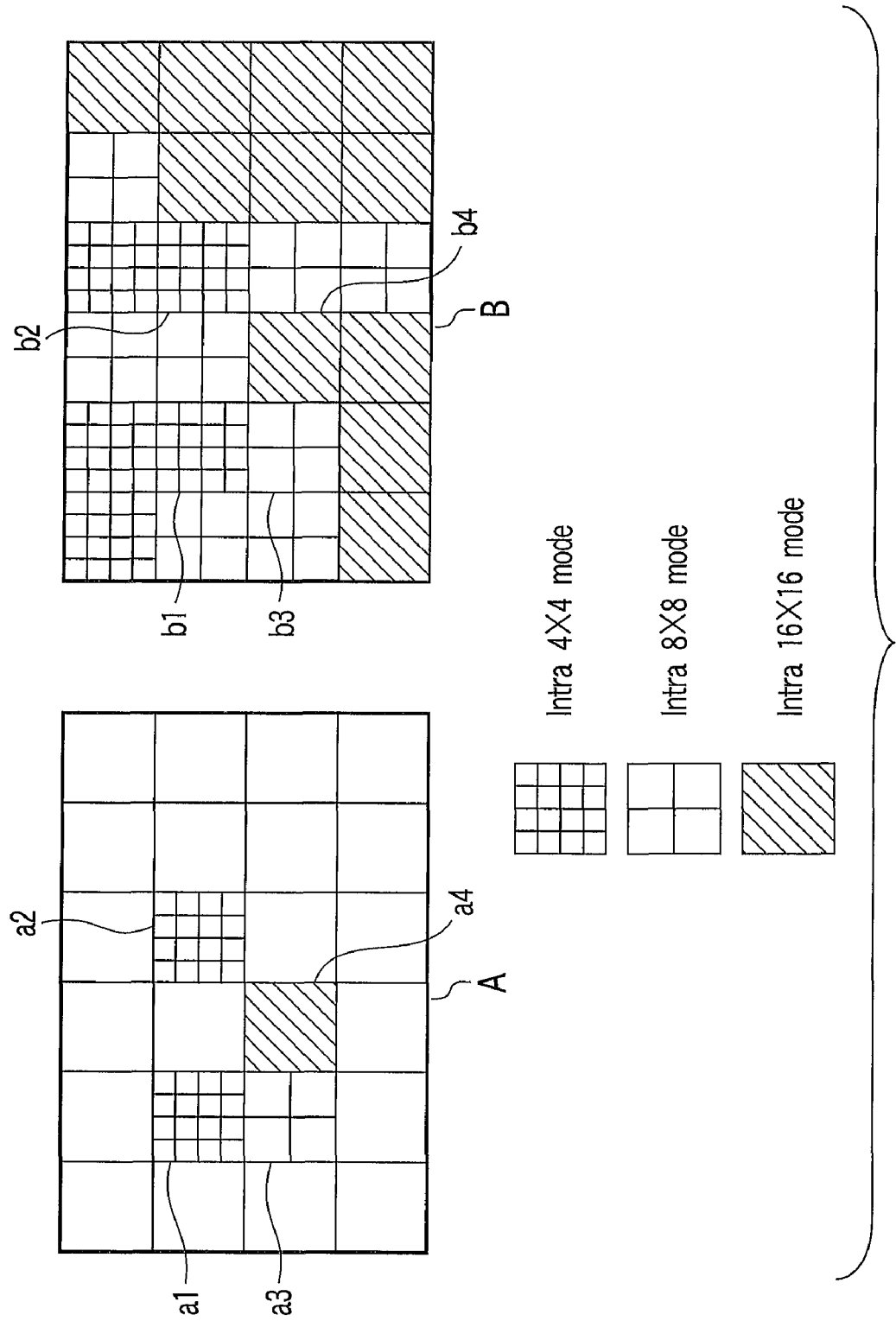
F I G. 4

INFORMATION PROCESSING APPARATUS, CONVERSION CIRCUIT, AND PROGRAM

CROSS-REFERENCE TO RELATED APPLICATIONS

This application is based upon and claims the benefit of priority from Japanese Patent Application No. 2007-168022, filed Jun. 26, 2007, the entire contents of which are incorporated herein by reference.

BACKGROUND

1. Field

One embodiment of the present invention relates to a motion picture stream signal conversion technique which can be suitably applied to an information processing apparatus such as a personal computer including a recording function of receiving, for example, digital television broadcast program data and recording the data on disk media.

2. Description of the Related Art

With recent advances in motion picture encoding techniques, information processing apparatuses which process motion pictures as digital signals have become widespread. Recently, people have begun to view/listen to and record digital television broadcast program data on personal computers using software having a function of processing motion pictures.

Under such circumstances, there have been proposed various techniques for efficiently recording motion picture stream signals on disk media such as hard disk drives (HDDs) and Digital Versatile Disks (DVDs) (see, e.g., Jpn. Pat. Appln. KOKAI Publication No. 10 304375).

Assume that the same motion picture encoding scheme such as a scheme using the H.264 format is used for a motion picture stream signal output from a broadcasting state as digital television broadcast program data and a motion picture stream signal recorded as record data on a disk medium. Even in this case, since detailed specifications are independently defined for these signals, re-encoding, transcoding, or the like may be required. A typical example of this is that the maximum GOP length defined on the input side is larger than that on the output side.

A GOP length corresponds to the interval between I-picture frames of three types of frames (I-picture, P-picture, and B-picture frames) defined by various types of motion picture encoding schemes in addition to the H.264 format. An I-picture frame is a picture frame encoded by using only information within an encoding target frame. In contrast, a non I-picture frame, i.e., a P/B-picture frame, is a picture frame encoded by using information outside an encoding target frame (information of a past or future frame).

For a motion picture stream signal as digital television broadcast program data which does not require much consideration of locating the start of a given program, this maximum GOP length is often defined as a relatively large value. In contrast, for a motion picture stream signal as record data which requires consideration of locating the start of a given program, this maximum GOP length is often defined as a relatively small value. Such a situation can occur not only in a case in which a motion picture stream signal output from a broadcasting state is recorded on a disk medium but also in a case in which a motion picture stream signal recorded on a given disk medium is moved or copied to another disk medium, detailed specifications on the two disk media differ from each other (maximum GOP length on input side>maximum GOP length on output side), even though the media use the same motion picture encoding scheme.

Conventionally, in such a case, all input motion picture stream signals are temporarily decoded (even though the same motion picture encoding scheme is used on both sides), and the decoding results are encoded again, thus performing an enormous amount of conversion processing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary conceptual view representing a processing target frame on a macroblock basis to explain the operation principle unique to the picture conversion processing unit shown in FIG. 3;

DETAILED DESCRIPTION

Various embodiments according to the invention will be described hereinafter with reference to the accompanying drawings. In general, according to one embodiment of the invention, an information processing apparatus includes a first determination unit which determines whether or not a processing target frame is a frame of the predetermined type, a second determination unit which determines whether or not an interval between the frame and a frame of the predetermined type located temporally nearest in a forward direction exceeds a predetermined frame count, when the first determination unit determines that the processing target frame is not a frame of the predetermined type, and a conversion unit which converts the processing target frame into a frame of the predetermined type, when the second determination unit determines that the interval exceeds the predetermined frame count.

Figure 1:
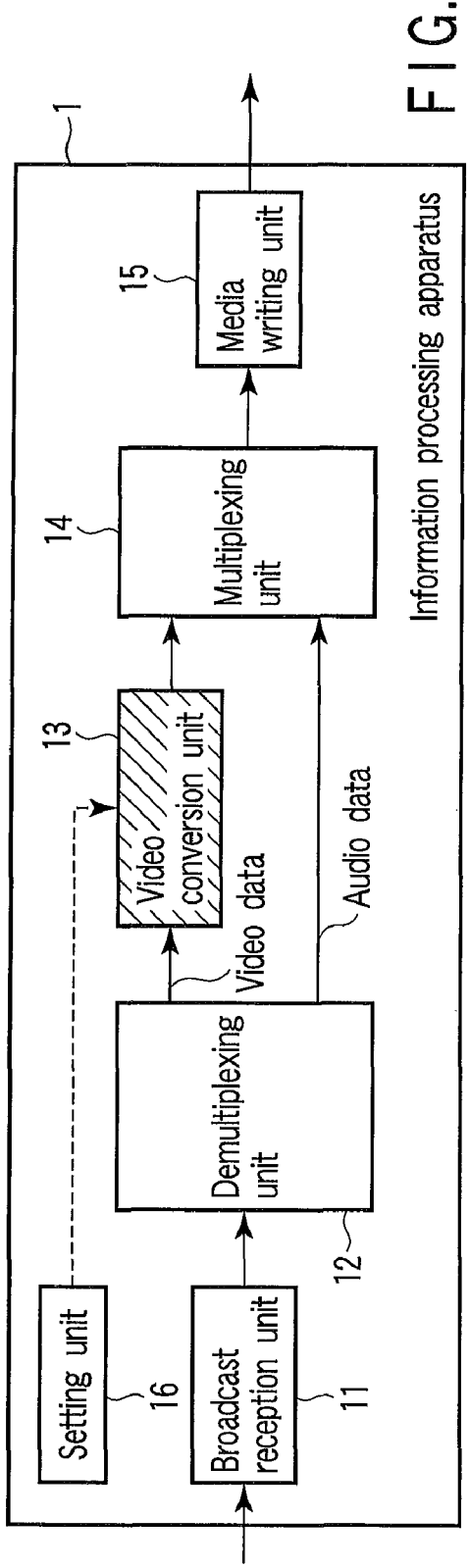
FIG. 1 is an exemplary block diagram showing the schematic arrangement of a conversion mechanism for motion picture stream signals in an information processing apparatus according to an embodiment of the invention.

FIG. 1 shows the schematic arrangement of a conversion mechanism for motion picture stream signals in an information processing apparatus 1 according to this embodiment. The information processing apparatus 1 is implemented as, for example, a personal computer equipped with a High-Definition (HD) DVD R/RW drive or an HD DVD recorder.

As shown in FIG. 1, the information processing apparatus 1 includes a broadcast reception unit 11, a demultiplexing unit 12, a video conversion unit 13, a multiplexing unit 14, and a media writing unit 15. Assume that the information processing apparatus 1 receives a motion picture stream signal encoded by the motion picture encoding scheme using the H.264 format as digital television broadcast program data, and writes the motion picture stream signal encoded by the motion picture encoding scheme using the same H.164 format, as record data, on a disk medium. Assume also that since (maximum GOP length of digital television broadcast program data)>(maximum GOP length of record data), it is necessary to perform conversion processing for a motion picture stream signal in a so called recording mode.

Figure 2:
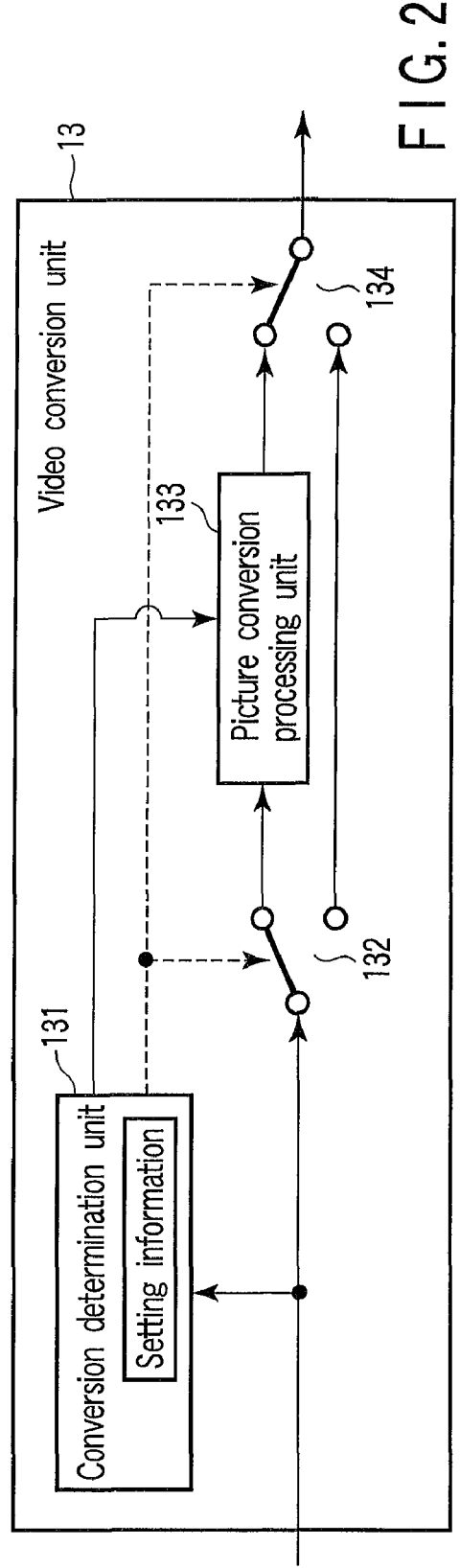
FIG. 2 is an exemplary block diagram showing an arrangement of the video conversion unit shown in FIG. 1.

The motion picture stream signal received by the broadcast reception unit 11 is guided to the demultiplexing unit 12 to be separated (demultiplexed) into video data and audio data. The video data separated by the demultiplexing unit 12 is supplied to the video conversion unit 13 and subjected to conversion processing which satisfies detailed specifications defined on the output side. FIG. 2 shows an example of the arrangement of the video conversion unit 13.

The multiplexing unit 14 multiplexes the video data subjected to conversion processing by the video conversion unit 13 with the audio data separated by the demultiplexing unit 12. The multiplexing unit 14 supplies the resultant data to the media writing unit 15 and records it on an HDD, HD DVD, or the like.

As shown in FIG. 2, the video conversion unit 13 includes a conversion determination unit 131, a switch 132, a picture conversion processing unit 133, and a switch 134. The basic principle of conversion processing for video data which is executed by the video conversion unit 13 will be described first with reference to FIG. 3.

Figure 3:
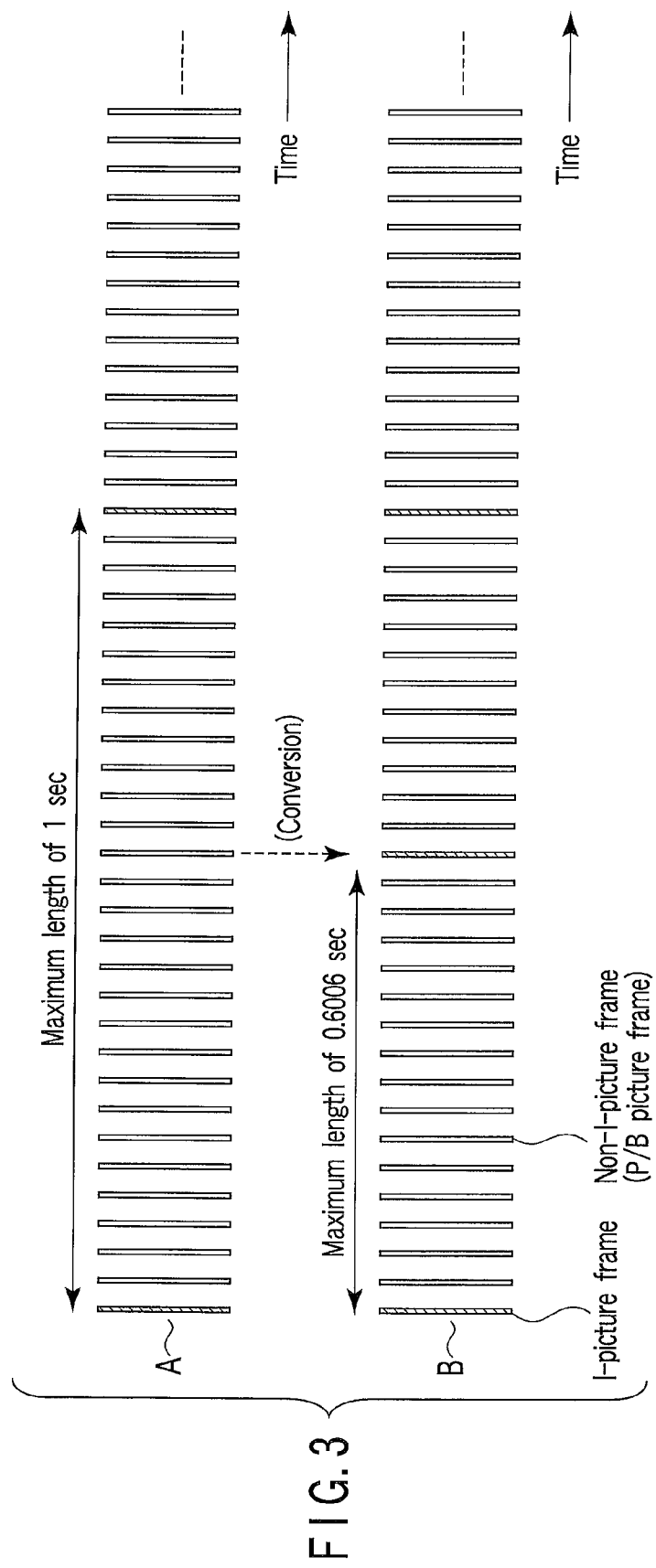
FIG. 3 is an exemplary conceptual view representing a motion picture stream signal in time series on a frame basis to explain the basic principle of conversion processing for video data which is executed by the video conversion unit in FIG. 1.

In FIG. 3, "A" is an exemplary conceptual view showing the motion picture stream signal (video data in the motion picture stream signal) received by the broadcast reception unit 11 in time series on a frame basis. As shown in "A", an I-picture frame is provided at least per sec (maximum GOP length=1 sec). In contrast to this, an I-picture frame must be provided at least per 0.6006 sec (maximum GOP length=0.6006 sec) for a motion picture stream signal to be written on a disk medium by the media writing unit 15. For this reason, as shown in "B" of FIG. 3, the video conversion unit 13 converts, into an I-picture frame, only a non I-picture (P/B-picture) frame located at a time point when the interval from the immediately preceding I-picture frame exceeds the maximum GOP length required for the conversion destination. The video conversion unit 13 has a mechanism for reducing conversion processing from a non I-picture (P/B-picture) frame into an I-picture frame. This point will be described in detail below.

First, the conversion determination unit 131 executes driving control on the switch 132 and the switch 134. The video data supplied from the demultiplexing unit 12 is switched by the switches 132 and 134 to be either output to the multiplexing unit 14 via the picture conversion processing unit 133 or output to the multiplexing unit 14 without via the picture conversion processing unit 133. As a switching technique for this operation, the conversion determination unit 131 determines whether a given frame is an I-picture frame and also determines, if the given frame is a non I-picture frame, whether the elapsed time from the immediately preceding I-picture frame exceeds the maximum GOP length (required for the output destination).

If the given frame is an I-picture frame or if the given frame is a non I-picture frame but the elapsed time does not exceed the maximum GOP length, the conversion determination unit 131 performs driving control on the switches 132 and 134 to output the picture data of the frame to the multiplexing unit 14 without via the picture conversion processing unit 133. In contrast, if the given frame is a non I-picture frame and the elapsed time from the immediately preceding I-picture frame exceeds the maximum GOP length, the conversion determination unit 131 performs driving control on the switches 132 and 134 to output the picture data of the frame to the multiplexing unit 14 via the picture conversion processing unit 133. That is, the picture conversion processing unit 133 converts a non I-picture frame into an I-picture frame.

The operation principle unique to the picture conversion processing unit 133, which converts a non I-picture frame into an I-picture frame, will be described with reference to FIG. 4.

In FIG. 4, "A" is an exemplary conceptual view representing a non I-picture frame before conversion on a macroblock basis. Macroblocks are partial images obtained by dividing an encoding target frame on a 16 pixel×16 pixel basis. Of the macroblocks shown in "A", macroblocks a1 to a4 are those encoded by using the intra-prediction mode.

Each macroblock in a non I-picture frame is encoded by using either the intra-prediction mode or the inter-prediction mode. The intra-prediction mode is an encoding mode using only information in the encoding target frame. The inter-prediction mode is an encoding mode using both information in the encoding target frame and information outside the frame (information in a past or future frame).

The intra-prediction mode includes three types of modes, namely an intra 4×4 mode of predicting a partial image of a processing target macroblock in a size of 4 pixel×4 pixel like the mode used for the macroblocks a1 and a2, an intra 8×8 mode of performing prediction in a size of 8 pixel×8 pixel like the mode used for the macroblock a3, and an intra 16×16 mode of performing prediction in a size of 16 pixel×16 pixel like the mode used for the macroblock a4. According to the intra-prediction mode, in the intra 4×4 mode and intra 8×8 mode of the intra-prediction mode, a prediction direction is selected from nine different directions. In the 16×16 mode, a prediction direction is selected from four different directions. That is, the intra-prediction mode needs to perform processing of determining an optimal one of 9×2+4=22 prediction directions in consideration of the code amount and the magnitude of distortion caused by encoding.

In general, all 22 prediction directions are tried, and a direction corresponding to the highest evaluation value is selected. In contrast to this, considering that all the macroblocks of an I-picture frame as a conversion destination are encoded by the intra-prediction mode, the picture conversion processing unit 133 in this embodiment omits such mode determination processing for the macroblocks encoded by the intra-prediction mode in a non I-picture frame as a conversion source, and allows to select one or both of the prediction size and direction. In FIG. 4, "B" is an exemplary conceptual view representing an I-picture frame after conversion on a macroblock basis. As shown in "B", for the respective macroblocks at positions corresponding to the macroblocks a1 to a4 described above, the same modes as those before conversion are selected. This can reduce the amount of processing for mode determination.

A setting unit 16 provides an interface allowing the user to set, for example, for each macroblock of a non I-picture frame before conversion which is encoded by the intra-prediction mode, operation of determining whether to select the prediction size or direction without any change, only the prediction size, or both the prediction size and direction. Increasing the number of items to be evaluated again and selected instead of selecting them without any change will improve the quality of the corresponding partial image after encoding. On the other hand, this increases the cost.

The contents set by the setting unit 16 are notified to the video conversion unit 13. The conversion determination unit 131 then holds them as setting information. Second, The conversion determination unit 131 then executes driving control on the picture conversion processing unit 133 to make it operate in accordance with the contents set by the user on the basis of the setting information.

That is, the picture conversion processing unit 133 converts a non I-picture frame before conversion into an I-picture frame while selecting one or both of a prediction size and direction for each macroblock of the non I-picture frame which is encoded by the intra-prediction mode in accordance with an instruction from the conversion determination unit 131.

A conversion processing sequence for motion picture stream signals which is executed by the information processing apparatus 1 will be described next with reference to FIGS. 5 and 6.

Figure 5:
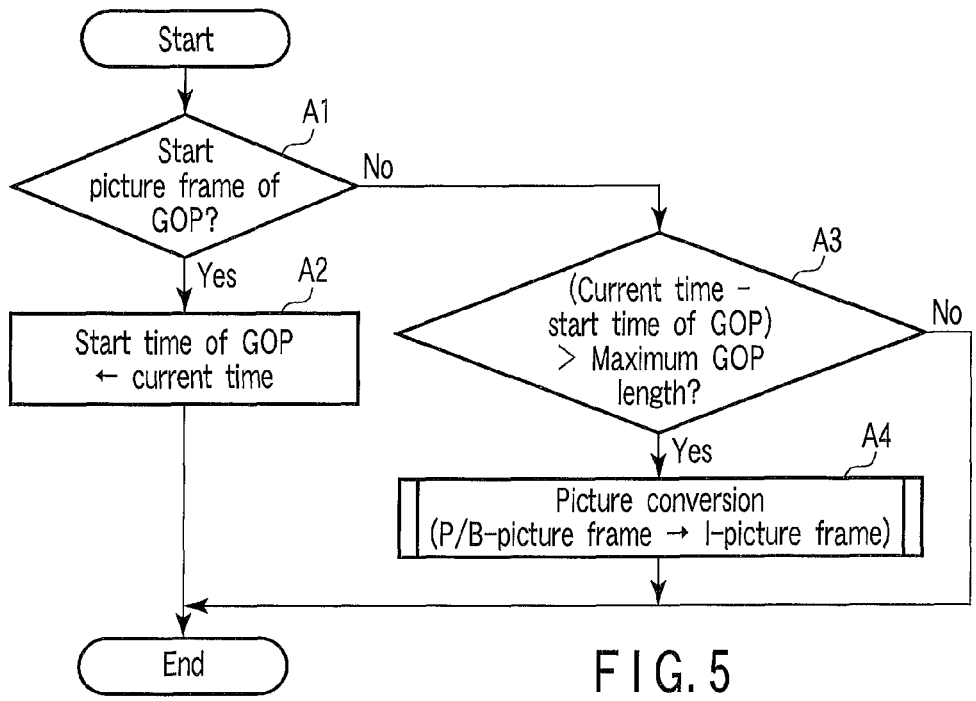
FIG. 5 is an exemplary flowchart showing a conversion processing sequence for a motion picture stream signal which is executed by the information processing apparatus according to the embodiment.

First of all, the information processing apparatus 1 checks whether or not a processing target frame is the start picture (i.e., an I-picture) frame of a GOP (block A1 in FIG. 5). If the target frame is the start picture frame of the GOP (YES in block A1 in FIG. 5), the apparatus 1 stores the current time as the start time of the GOP (block A2 in FIG. 5).

If the target frame is not the start picture frame of the GOP (NO in block A1 in FIG. 5), the apparatus 1 then checks whether or not the value obtained by subtracting the stored start time of the GOP from the current time does not exceed the maximum GOP length (block A3 in FIG. 5). If this value exceeds the maximum GOP length (YES in block A3 in FIG. 5), the apparatus 1 executes picture conversion (details of which are shown in FIG. 6) to convert the processing target frame (P/B-picture frame) into an I-picture frame (block A4 in FIG. 5).

Figure 6:
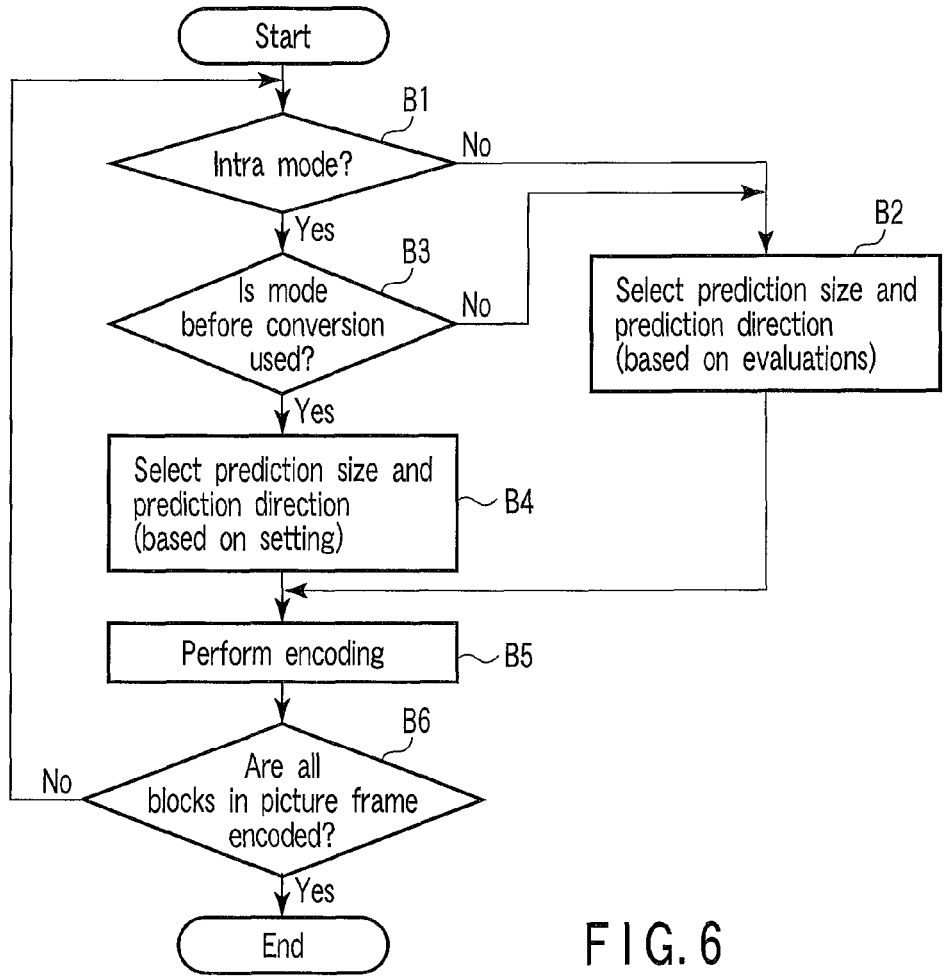
FIG. 6 is an exemplary flowchart showing a detailed sequence in the picture conversion process in FIG. 5.

In picture conversion, first of all, the apparatus 1 checks whether or not a given macroblock is encoded by the intra-prediction mode (block B1 in FIG. 6). If the macroblock is encoded by the inter-prediction mode, i.e., is not encoded by the intra-prediction mode (NO in block B1 in FIG. 6), all 9×2+4=22 prediction directions are tried, and optimal prediction size and direction are selected (block B2 in FIG. 6).

Even if the macroblock is encoded by the intra-prediction mode (YES in block B1 in FIG. 6), if setting is not made to use the mode before conversion (NO in block B3 in FIG. 6), all 9×2+4=22 prediction directions are tried, and optimal prediction size and direction are selected as in the above case (block B2 in FIG. 6).

If the macroblock is encoded by the intra-prediction mode (YES in block B1 in FIG. 6) and setting is made to use the mode before conversion (YES in block B3 in FIG. 6), the apparatus 1 selects a prediction size and direction on the basis of the setting while referring to only a prediction size or both a prediction size and direction from the mode before conversion (block B4 in FIG. 6).

The apparatus 1 encodes a macroblock by using the prediction size and direction selected in the above manner (block B5 in FIG. 6), and determines whether all the macroblocks are encoded (block B6 in FIG. 6). If all the macroblocks are encoded (YES in block B6 in FIG. 6), the processing for this frame is terminated.

As described above, the information processing apparatus 1 can reduce the conversion processing for motion picture stream signals.

Although the above embodiment has exemplified the case in which the motion picture stream signal output from a broadcasting station is recorded on a disk medium, the technique of the present invention is not limited to this. Obviously, for example, the present invention can be applied to a case in which a motion picture stream signal recorded on a given disk medium is moved or copied to another disk medium.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus which converts a motion picture stream signal encoded with a maximum length between frames of a predetermined type encoded by using only information within an encoding target frame being a first frame count into a motion picture stream signal with the maximum length between frames of the predetermined type being a second frame count smaller than the first frame count, the apparatus comprising:
    a first determination unit configured to determine whether or not a processing target frame is a frame of the predetermined type;
    a second determination unit configured to determine whether or not an interval between the frame and a frame of the predetermined type located temporally nearest in a forward direction exceeds the second frame count, when the first determination unit determines that the processing target frame is not a frame of the predetermined type; and
    a conversion unit configured to convert the processing target frame into a frame of the predetermined type, when the second determination unit determines that the interval exceeds the second frame count.

2. The information processing apparatus according to claim 1, wherein the frame of the predetermined type is an intra frame encoded by using only the information in the encoding target frame.

3. The information processing apparatus according to claim 2, wherein the conversion unit determines whether or not each macroblock obtained by dividing a processing target frame is a macroblock using an intra-prediction mode of performing encoding by using only information within the frame, and selects a type of mode of the intra-prediction mode used before conversion when determining that the macroblock is a macroblock encoded by using the intra-prediction mode.

4. The information processing apparatus according to claim 3, wherein the intra-prediction mode includes an intra 4×4 mode of predicting a partial image of a processing target macroblock in a size of 4 pixel×4 pixel, an intra 8×8 mode of performing prediction in a size of 8 pixel×8 pixel, and an intra 16×16 mode of performing prediction in a size of 16 pixel×16 pixel.

5. The information processing apparatus according to claim 3, wherein the conversion unit selects a direction used before conversion.

6. The information processing apparatus according to claim 5, further comprising a setting unit configured to make setting to determine whether or not to select at least one of a type of mode of the intra-prediction mode and a direction which have been used as a type of mode of the intra-prediction mode and a prediction direction before conversion when the conversion unit is to convert a processing target frame into the intra frame.

7. A non-transitory computer-readable medium having stored thereon a computer program which is executable by a computer which converts a motion picture stream signal encoded with a maximum length between frames of a predetermined type encoded by using only information within an encoding target frame being a first frame count into a motion picture stream signal with the maximum length between frames of the predetermined type being a second frame count smaller than the first frame count, the computer program controlling the computer to function as:

a first determination unit configured to determine whether or not a processing target frame is a frame of the predetermined type;
  a second determination unit configured to determine whether or not an interval between the frame and a frame of the predetermined type located temporally nearest in a forward direction exceeds the second frame count, when the first determination unit determines that the processing target frame is not a frame of the predetermined type; and
  a conversion unit configured to convert the processing target frame into a frame of the predetermined type, when the second determination unit determines that the interval exceeds the second frame count.

8. The storage medium of claim 7, wherein the frame of the predetermined type is an intra frame encoded by using only the information in the encoding target frame.

9. The storage medium of claim 8, wherein the conversion unit determines whether or not each macroblock obtained by dividing a processing target frame is a macroblock using an intra-prediction mode of performing encoding by using only information within the frame, and selects a type of mode of the intra-prediction mode used before conversion when determining that the macroblock is a macroblock encoded by using the intra-prediction mode.

10. The program according to storage medium of claim 9, wherein the intra-prediction mode includes an intra 4×4 mode of predicting a partial image of a processing target macroblock in a size of 4 pixel×4 pixel, an intra 8×8 mode of performing prediction in a size of 8 pixel×8 pixel, and an intra 16×16 mode of performing prediction in a size of 16 pixel×16 pixel.

11. The storage medium of claim 9, wherein the conversion unit selects a direction used before conversion.

12. The storage medium of claim 11, wherein the computer program further controls the computer to function as a setting unit configured to make setting to determine whether or not to select at least one of a type of mode of the intra-prediction mode and a direction which have been used as a type of mode of the intra-prediction mode and a prediction direction before conversion when the conversion unit is to convert a processing target frame into the intra frame.

* * * * *